E. WATKINS & J. H. MILLER.
HOSE COUPLING.
APPLICATION FILED OCT. 2, 1907.
927,388.
Patented July 6, 1909.
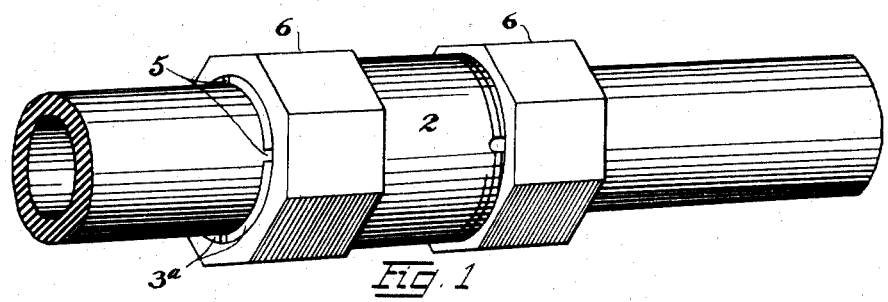
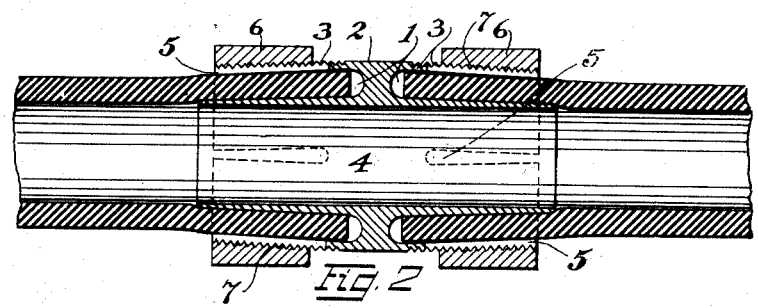
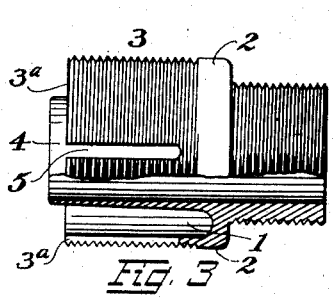
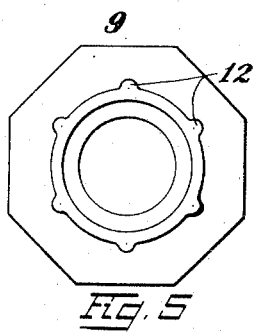
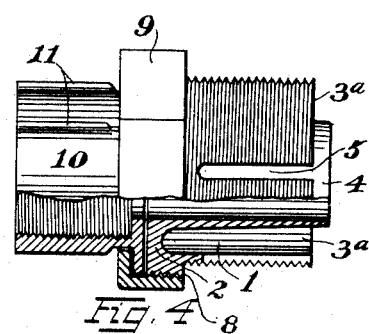
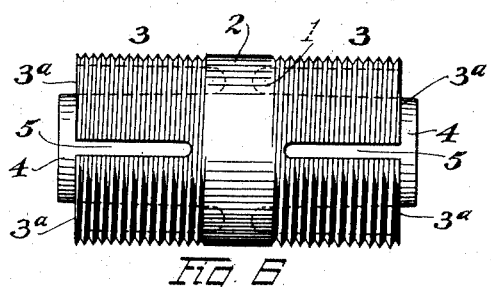
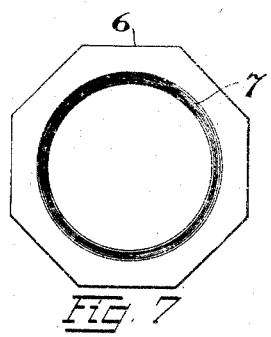
Witnesses:
Inventors,
Evan Watkins
John H. Miller
by Obed C. Billman attorney.

UNITED STATES PATENT OFFICE.

EVAN WATKINS, OF CLEVELAND, AND JOHN H. MILLER, OF ELYRIA, OHIO.

HOSE-COUPLING.

No. 927,388.　　　　　Specification of Letters Patent.　　　　Patented July 6, 1909.

Application filed October 2, 1907. Serial No. 395,479.

*To all whom it may concern:*

Be it known that we, EVAN WATKINS and JOHN H. MILLER, citizens of the United States, residing at Cleveland, in the county of Cuyahoga and State of Ohio, and at Elyria, in the county of Lorain and State of Ohio, respectively, have invented certain new and useful Improvements in Hose-Couplings, of which the following is a specification.

It is customary in the art of hose and pipe couplings to provide the hose ends thereof with inner sleeves and to arrange about such sleeve clamping members which are adapted to be drawn inward into engagement with the hose section at the free ends whereby the hose is either bunched as it were, into the receiving end or it is merely held by such free ends and this is not sufficient to prevent leakage under extremely high pressure or to prevent the loosening up of the hose end.

The object of the present invention therefore is to provide clamping members of a uniform thickness throughout their length and to arrange them in a manner such that normally they are in a cylindrical formation about said sleeve forming an annular opening for the reception of the hose section, and further to provide in connection with such clamping members suitable means surrounding the same and adapted to draw them in singly against the hose end so that they clamp upon the hose throughout substantially their entire length of such clamping members.

With the above and other ends in view, the invention consists in the novel construction, arrangement and combination of parts, hereinafter described, illustrated in the accompanying drawings, and particularly pointed out in the appended claims.

Referring to the drawings, forming a part of this specification, Figure 1, is a perspective view of the improved coupling as applied to an ordinary hose-pipe. Fig. 2, a longitudinal sectional view of the same. Fig. 3, a view of a modified form embodying a male hose-nipple. Fig. 4, a view of a modified form provided with a flanged union carrying a female hose-nipple for screwing over a stopcock or receiving the male nipple shown in Fig. 3. Fig. 5, an end view of the modified form shown in Fig. 4, the female hose-nipple being removed. Fig. 6, a side elevation of the improved clamping coupling or bridging member. Fig. 7, a view of the enlarged or receiving end of one of the clamping sleeve-nuts.

Similar characters of reference designate like parts throughout all the figures of the drawings.

The primary form of the improved coupling comprises but three parts, viz.: the main clamping coupling, proper, or bridge member, and the clamping sleeve-nuts for taking over the ends of the main coupling or bridge member.

The main coupling or bridge member is provided in its walls with oppositely-disposed annular recess-grooves or channels 1, terminating at their closed or base ends in a central ring or exteriorly-smooth body portion 2, and forming an exteriorly screw-threaded clamping-shell or outer body portion 3, hereinafter more fully described, and an inner or central sleeve member or core portion 4, provided with a diametrically-uniform bore equal to the diameter of the opening or duct of the adjacent ends of the hose or pipe to be connected and into which the ends of said tubular member are adapted to be inserted as shown most clearly in Fig. 2, of the drawings.

The annular recess-channels 1, intermediate the end portions of the inner tubular member 4, and outer body portion 3, are adapted to receive and take over the ends of the hose or pipe to be connected, and, it will be observed, that the end portions of the inner tubular member 4, extend beyond the ends of the outer body portion 3, and that the outer periphery thereof is tapered from the central ring portion 2, outwardly to the ends, the former feature being for the purpose of preventing the cutting, breaking or mutilating of the inner walls of the hose at the ends of the tubular member, while the latter feature is for the purpose of spreading the ends of the hose preparatory to being clamped within the annular recess-channels 1, as hereinafter described, as well as affording a better bearing-surface therein.

The exteriorly screw-threaded outer body portion 3, is split at its ends by means of longitudinal slits 5, preferably four in number, forming spring-clamping-members 3ª, adapted to be clamped down upon the outer walls of the ends of the hose surrounding the end portions of the inner tubular member 4, by means of clamping sleeve-nuts 6, each having a flaring screw-threaded-bore or opening 7, as shown most clearly in Fig. 7, of the drawings. The nuts are preferably octagonal in form as shown, and it is evident that when the ends of the hose have been placed in the annular recess-channels 1, and the flaring or receiving side of the nuts 6, are drawn up, the clamping-members 3ª, will be drawn down and securely clamp or pinch the ends of the hose about the ends of the inner tubular member 4, as shown most clearly in Fig. 2, of the drawings.

In Fig. 3, is shown the main coupling member in the form of a male hose-nipple, while in Fig. 4, is shown one side or half of the main coupling member provided with an exteriorly screw-threaded head 8, with a flanged octagon-nut 9, taking over and carrying a flanged female hose-nipple 10, for securing over a stop-cock, or receiving the male hose-nipple shown in Fig. 3. It will be observed that the female hose-nipple 10, is provided about its periphery with a plurality of longitudinally-extending ribs 11, by means of which the hose-nipple may be drawn up or loosened on the stop-cock. Upon referring to Fig. 5, it will also be observed that the opening of the octagon-nut 9, is provided with a plurality of recess-grooves 12, adapted to register with and take over the ribs 11, of the nipple 10.

From the foregoing description, taken in connection with the accompanying drawings, the operation and advantages of our invention will be readily understood.

Having thus described our invention, without having attempted to set forth all the forms in which it may be made, or all the modes of its use, we declare that what we claim and desire to secure by Letters Patent, is,—

1. A hose coupling member comprising a body portion having integral inner and outer hose clamping sleeves, the inner sleeve having its outer surface tapered toward the free end, and the outer sleeve being cut or slotted inward from the free end and having an inner surface which is normally substantially cylindrical and an outer surface which is threaded, said inner and outer sleeves forming an annular space which is adapted to receive the hose and is normally of greater width at the open or outer end than at the inner end, and a tapered clamping nut engaging the threads on the outer sleeve and serving when tightened to draw the sections of the latter inward so that the clamping surfaces of the two sleeves are substantially parallel and the sections of the outer sleeve bear against the hose with substantially uniform pressure throughout their hose engaging length.

2. A hose-coupling member comprising a body portion provided with an inner sleeve for receiving the hose section said sleeve having its outer surface tapered toward its free end clamping members integral with said body portion, arranged in substantially a cylindrical formation around said sleeve and provided with screw threads on their exterior, said clamping members being substantially uniform in thickness throughout their length and a nut for engaging the threaded clamping members and causing them to firmly engage the hose section throughout their hose clamping length.

3. A hose-coupling comprising hose receiving ends each provided with an inner sleeve the outer surface of which is tapered toward its free end clamping members integral with each receiving member and arranged in substantially a cylindrical formation around the corresponding sleeve, said clamping members being substantially uniform in thickness throughout their length and means adapted to be secured about said clamping members for causing the same to firmly engage the hose section throughout their hose clamping length.

4. A hose-coupling comprising hose receiving ends each provided with an inner sleeve tapering toward its outer end clamping members integral with each hose receiving end and arranged in substantially a cylindrical formation around the corresponding sleeve and provided on their exterior with screw threads, said clamping members being substantially uniform in thickness throughout their length and a tapered nut engaging the threads on said clamping members for causing the same to firmly clamp the hose section against the inner sleeve throughout their hose clamping length.

In testimony whereof we have affixed our signatures, in presence of two witnesses.

EVAN WATKINS.
JOHN H. MILLER.

Witnesses:
 CHARLES AUSTIN,
 W. C. BROCKETT.